United States Patent Office 2,937,187
Patented May 17, 1960

2,937,187

N,N'-DI(PHTHALIDYL-3) DERIVATIVES OF AROMATIC DIAMINES

Donald D. Wheeler and David C. Young, Midland, Mich., assignors to The Dow Chemical Company, Midland, Mich., a corporation of Delaware No Drawing. Application October 6, 1958
Serial No. 765,303

6 Claims. (Cl. 260—343.3)

This invention is concerned with diphthalides having the formula

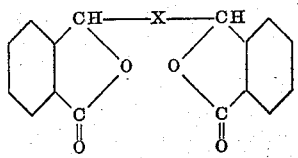

In this and succeeding formulae X is a divalent radical having the structure

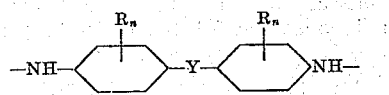

or

wherein R is hydrogen or lower alkyl, Y is oxygen or methylene, and $n$ is an integer of from 1 to 2, inclusive. By "lower alkyl" is meant a radical containing from 1 to 4 carbon atoms, inclusive, such as methyl, ethyl, propyl, isopropyl, normal-butyl, secondary-butyl and tertiary-butyl.

The new compounds are amber-colored liquids or light colored crystalline solids. They are somewhat soluble in the common organic solvents such as acetone and ethanol and substantially insoluble in water and petroleum ether. These compounds exhibit biological activity and are useful as toxicants in fungicidal, germicidal, insecticidal and herbicidal compositions.

The above compounds may be prepared by causing phthalaldehydic acid to react with a diamine having the formula H—X—H wherein X is as above specified, to produce the desired phthalides and water of reaction. The terms "phthalaldehydic acid" and "3-hydroxyphthalide" refer to a compound having the structure

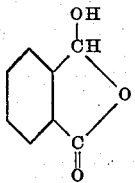

Phthalaldehydic acid is often represented in the literature as having the structure

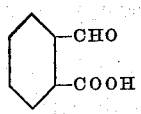

However, the acid employed in this invention and prepared as hereinafter described is almost entirely of the 3-hydroxyphthalide ring structure as indicated by its infrared absorption spectrum. Infrared data also indicate the phthalide products to have the ring structure.

The reaction for the preparation of the new compounds takes place readily in the temperature range of from 20° to 150° C. with the formation of the desired compound and water of reaction. It is preferably carried out in an inert solvent as reaction medium. Suitable solvents include acetone, benzene, butanone, water and alcohol. Good results are obtained when substantially equivalent proportions of the reactants are employed, however, a reasonable excess of either reactant does not interfere with the reaction. A large excess of phthalaldehydic acid, particularly at elevated temperatures, may form an anhydride by-product.

In carrying out the reaction, phthalaldehydic acid and the amine are dissolved in or mixed with the reaction solvent. Mixing of the reactants and solvent results in the development of heat of reaction. The resulting mixture is heated for a period of from a few minutes to four hours during which time the desired phthalide product usually precipitates in the reaction mixture. After completion of the heating period, the mixture is allowed to cool and the phthalide product, if a solid, is separated therefrom by filtration. The product may be purified, if desired, by washing and drying or by recrystallization. The product, if a liquid, is recovered from the mixture by heating the latter preferably at reduced pressure to distill off the solvent and water of reaction.

The following examples illustrate the invention but are not to be construed as limiting.

*Example 1.—3,3'-(methylenebis(2,6-dimethyl-p-phenyleneimino))diphthalide*

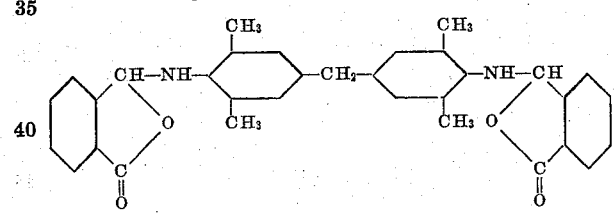

8.0 grams (0.0315 mole) of p,p'-methylenebis(2,6-dimethylaniline), 9.5 grams (0.063 mole) of phthalaldehydic acid and 25 milliliters of acetone were mixed and heated for a few minutes on the steam bath whereupon the entire mixture became a semi-solid mass. The mixture was then cooled and the 3,3'-(methylenebis(2,6-dimethyl-p-phenyleneimino))diphthalide product was removed therefrom by filtration. The latter was washed in acetone to recover 14 grams or an 85 percent yield of a purified product melting at 210.5°–211.5° C.

*Example 2.—3,3'-(p-phenylenediimino)diphthalide*

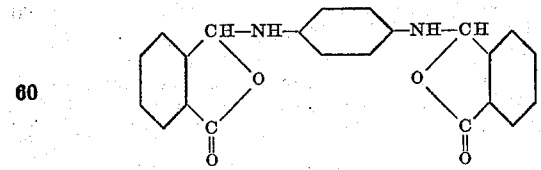

16.2 grams (0.15 mole) of p-phenylenediamine, 45 grams (0.30 mole) of phthalaldehydic acid and 100 milliliters of acetone were mixed whereupon heat of reaction developed and a solid precipitated. The mixture was then cooled and the 3,3'-(p-phenylenediimino)diphthalide product filtered therefrom. The latter, after washing with acetone, melted from 258° to 261° C. and amounted to 52 grams or 93 percent of theoretical.

Example 3.—3,3'-(methylenebis(p-phenyleneimino))diphthalide

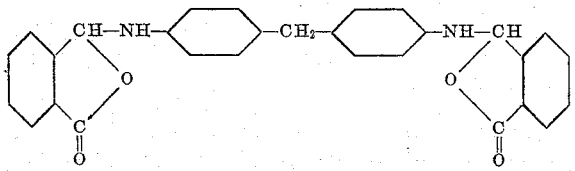

49.5 grams (0.25 mole) of p,p'-methylenedianiline, 75 grams (0.50 mole) of phthalaldehydic acid and 100 milliliters of acetone were mixed together whereupon heat of reaction developed and the reaction mixture became a semi-solid mass. The resulting mixture was heated on the steam bath for one-half hour and then cooled. The solid precipitate was recovered by filtration and subsequently washed with acetone to obtain a purified product melting at 202°–204° C. The latter amounted to 105 grams or 91 percent of theoretical.

Example 4.—3,3'-(oxybis(p-phenyleneimino))diphthalide

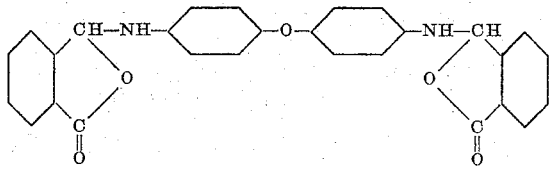

55.5 grams (0.25 mole) of a 90 percent p,p'-oxydianiline, 75 grams (0.5 mole) of phthalaldehydic acid and 250 milliliters of acetone were mixed together, whereupon heat of reaction was evolved and the mixture became a semi-solid mass. The latter was heated on the steam bath for one-half hour and then cooled. The mixture was filtered to obtain a solid 3,3'-(oxybis(p-phenyleneimino))diphthalide product which, after washing with acetone, melted at 190°–192° C. The yield amounted to 110.5 grams or 95 percent of theoretical.

Example 5.—3,3' - (p-phenylenebis(secondary - butylimino))-diphthalide

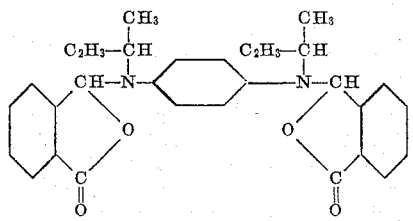

33 grams (0.15 mole) of N,N'-di-(secondary-butyl)-p-phenylenediamine, 45 grams (0.3 mole) of phthalaldehydic acid and 50 milliliters of acetone were mixed and heated on the steam bath for one hour. At the end of this period, the solution was cooled and poured into 700 milliliters of water which had been acidified with hydrochloric acid. A dark oil precipitated. The latter was separated by decantation, washed successively with water, dilute hydrochloric acid and water, and then extracted with benzene. The benzene solution was heated to distill the solvent and to recover a 3,3'-(p-phenylenebis(secondary-butylimino))diphthalide product as a viscous amber-colored oil having a refractive index $n_D^{60}$ of 1.558.

The diphthalides of this invention having the formula

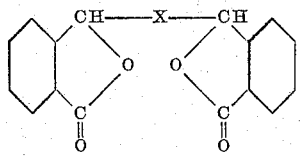

are useful as parasiticides and are adapted to be employed for the control of organisms such as *Staphylococcus aureus, Salmonella typhosa, Erwinia carotovora, Aerobacter aerogenes, Aspergillus terreus, Penecillium digitatum, Rhizopus nigricans,* Meloidogyne spp. and *Periplaneta americana*. They are also useful as herbicides for the control of germination of seeds and of root growth of seedlings of undesirable plant species such as *Raphanus sativus, Echinochloa frumentacea, Avena fatua* and *Phalaris canariensis*.

In a representative operation as a parasiticide for the control of bacterial and fungal organisms, culturing media were prepared as follows: (1) a medium containing 0.05 percent by weight of 3,3'-(oxybis(p-phenyleneimino))diphthalide; (2) a medium containing 0.05 percent by weight of 3,3'-(methylenebis(p-phenyleneimino))diphthalide; and (3) a medium containing 0.05 percent by weight of 3,3'-(p-phenylene-bis(secondary-butylimino))diphthalide. The resulting media as well as a check medium containing no phthalide compound were poured into separate Petri dishes and thereafter inoculated with a bacterial organism, *Staphylococcus aureus*. The inoculated media were incubated for 3 days at 30° C. and thereafter examined to ascertain the presence or absence of growth of the organism. The media containing 3,3'-(oxybis-(p-phenyleneimino))diphthalide, 3,3' - (methylenebis(p-phenyleneimino))diphthalide and 3,3'-(p-phenylenebis(secondary-butylimino))diphthalide showed complete absence of microbial growth whereas the check medium showed heavy growth of the test organism.

In a similar operation, 3,3'-(oxybis(p-phenyleneimino))diphthalide, 3,3' - (methylenebis(p-phenyleneimino))diphthalide and 3,3' - (p-phenylenebis(secondary - butylimino))diphthalide completely inhibited the growth of *Erwinia carotovora*, when separate culturing media containing one of the compounds at a concentration of 0.25 percent by weight were inoculated with said organism and incubated at 30° C. for 3 days.

In a representative operation for the control of insects, substantially complete mortalities were observed when cockroaches (*Periplaneta americana*) were wetted with an aqueous dispersion containing 2400 parts by weight of 3,3' - (p-phenylenediimino)diphthalide per million parts of dispersion or with a dispersion containing the 3,3'-(methylenebis(2,6 - dimethyl - p-phenyleneimino)) diphthalide at a concentration of 2400 parts by weight per million parts of the dispersion.

In a representative operation for use of the diphthalides of this invention as herbicides, complete controls of the germination and growth of radish (*Raphanus sativus*) and Japanese millet (*Echinochloa frumentacea*) were obtained when an aqueous dispersion of 3,3'-(methylenebis(2,6 - dimethyl - p - phenyleneimino)) diphthalide was applied at a rate of 50 pounds per acre to soil planted with these species.

The phthaladehydic acid employed in this invention may be prepared by first photochlorinating o-xylene to obtain $\alpha,\alpha,\alpha,\alpha',\alpha'$-pentachloro-o-xylene by passing chlorine gas into o-xylene while illuminating with sun lamps. The resulting chlorinated o-xylene is then heated with aqueous constant-boiling hydrochloric acid in ferric chloride solution as more fully disclosed in U.S. Patent 2,748,162.

This application is a continuation-in-part of copending application Serial Number 595,842, filed July 5, 1956, now abandoned.

We claim:

1. A diphthalide having the formula

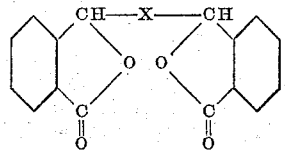

wherein X represents a radical selected from the group consisting of

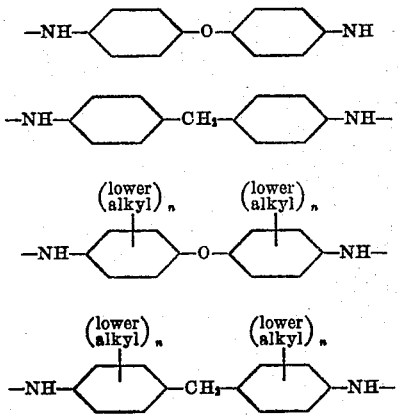

and

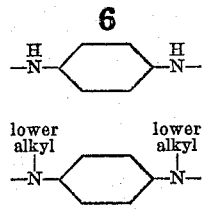

and wherein $n$ is an integer of from 1 to 2, inclusive.

2. 3,3'-(p-phenylenediimino)diphthalide.
3. 3,3'-(methylenebis(p-phenyleneimino))diphthalide.
4. 3,3' - (methylenebis(2,6 - dimethyl-p-phenyleneimino))diphthalide.
5. 3,3' - (p-phenylenebis(secondary - butylimino))diphthalide.
6. 3,3'-(oxybis(p-phenyleneimino))diphthalide.

References Cited in the file of this patent

Beilstein's Handbuch der Org. Chem., vol. 18, p. 606, Springer, Berlin (1934), Original.